United States Patent [19]
Casey

[11] Patent Number: 4,698,675
[45] Date of Patent: Oct. 6, 1987

[54] PROGRESSIVE SCAN DISPLAY SYSTEM HAVING INTRA-FIELD AND INTER-FIELD PROCESSING MODES

[75] Inventor: Robert F. Casey, Burgen County, N.J.

[73] Assignee: RCA Corporation, Princeton, N.J.

[21] Appl. No.: 912,631

[22] Filed: Sep. 29, 1986

[51] Int. Cl.$^4$ .............................................. H04N 7/01
[52] U.S. Cl. ...................................... 358/140; 358/11; 358/160
[58] Field of Search ........................ 358/140, 11, 160

[56] References Cited

U.S. PATENT DOCUMENTS

| | | | |
|---|---|---|---|
| 4,322,750 | 3/1982 | Lord et al. | 358/140 |
| 4,400,719 | 8/1983 | Powers | 358/21 R |
| 4,415,931 | 11/1983 | Dischert | 358/242 |
| 4,451,848 | 5/1984 | Okada et al. | 358/140 |
| 4,558,347 | 12/1985 | Pritchard et al. | 358/11 |
| 4,583,113 | 4/1986 | Pritchard | 358/11 |
| 4,598,309 | 7/1986 | casey | 358/11 |
| 4,623,913 | 11/1986 | Fling et al. | 358/11 |
| 4,630,098 | 12/1986 | Fling | 358/11 |
| 4,641,188 | 2/1987 | Dischert | 358/140 |

FOREIGN PATENT DOCUMENTS 177460  5/1983  Japan .

OTHER PUBLICATIONS

Murata et al., "A Consumer Use Flicker Free Color Monitor Using Digital Signal Processing" IEEE Transactions on Consumer Electronics, vol. CE-32, No. 3, Aug. 1986, pp. 215-227.

*Primary Examiner*—Howard W. Britton
*Attorney, Agent, or Firm*—Paul J. Rasmussen; Peter M. Emanuel; Richard G. Coalter

[57] ABSTRACT

An interlaced video input signal is applied to a speed-up unit which time compresses and interleaves lines of the input signal with lines of a further signal derived therefrom for display in progressive scan fashion on a display device. The further signal is generated by circuitry which derives line-interpolated, field-delayed and vertical detail signals from the input signal. Selection circuitry selects the field delayed signal for display when the detail signal is above a threshold level and the field-delayed signal is concurrently within a range bounded by the input signal and the line-delayed signal, the interpolated signal being selected for display otherwise to thereby provide a progressive scan display having relatively high vertical detail characteristic of interfield processing and immunity to motion artifacts characteristic of intra-field processing. Noise due to quantizing errors or poor input signal-to-noise conditions is further reduced by range extension circuitry which increases the selection range beyond the values bounded by the input and line-delayed signals for selection of the field-delayed signal.

13 Claims, 16 Drawing Figures

$|A-B|<T$ $|A-B|<T$ $|A-B|<T$

PROGRESSIVE SCAN DISPLAY SYSTEM HAVING INTRA-FIELD AND INTER-FIELD PROCESSING MODES

FIELD OF THE INVENTION

This invention relates to progressive scan display systems of the type employing both inter-field and intra-field processing techniques for converting interlaced video signals to non-interlaced form for display in progressive scan fashion on a display device.

BACKGROUND OF THE INVENTION

The advantages of displaying interlaced television signals in progressive scan form are well known and a number of techniques have been proposed for providing interlaced to progressive scan conversions. Generally speaking, the known techniques may be categorized as involving either intra-field processing or intra-frame processing or a combination of the two. An intra-field system derives the extra lines needed for display in a progressive scan system entirely from one field of the currently received lines. Advantageously, such systems are not subject to motion related artifacts. Examples of such systems are described, for example, by Dischert in U.S. Pat. No. 4,415,931 which issued Nov. 15, 1983, by Powers in U.S. Pat. No. 4,400,719 which issued Aug. 23, 1983, by Pritchard in U.S. Pat. No. 4,583,113 which issued Apr. 15, 1986 and by Okada et al. in U.S. Pat. No. 4,451,848 which issued May 29, 1984. In the Dischert system, extra lines for display are obtained by repeating lines of the incoming field. In the Powers, Pritchard and Okada et al. systems the added display lines are obtained by interpolation of adjacent vertical lines of a currently received field.

Although intra-field systems are inherently free of motion related artifacts, they tend to suffer a loss of vertical detail due to line averaging. One solution to this problem, proposed by Pritchard et al. (U.S. Pat. No. 4,558,347 which issued Dec. 10, 1985), is to derive a vertical detail component from the incoming video signal and selectively add the detail component to lines of the displayed progressively scanned signal. Another solution proposed in the aforementioned Powers patent, is to obtain the extra lines for the progressive scan display from the previous field or frame. To solve both the motion and vertical detail related problems, Powers proposed a hybrid system employing both intra-field and inter-field processing. Specifically, the system employs a motion detector which selects a line interpolated signal for display (intra-field processing) when motion is present in a scene and selects a field or frame delayed signal for display (inter-field processing) when motion is not present.

Other examples of hybrid progressive scan systems in which the added lines for display are obtained from the current field and a previous field or frame are described by Lord et al. in U.S. Pat. No. 4,322,750 (issued Mar. 30, 1982), by Casey in U.S. Pat. No. 4,598,309 (issued Jul. 1, 1986) and by Tanaka in Japanese Pat. Appln. No. SHO- 58-79379 (Laid open May 13, 1983). In an example of the Lord et al. system a movement detector selects a spatially averaged signal for display when motion is present and a temporally averaged signal otherwise. In the Casey system a frame averaged signal is substituted for a field-delayed and line averaged signal when motion is present. In the Tanaka system extra lines for the progressive display are obtained by combining a low frequency component of a previous field with a high frequency component obtained by interpolation of lines from a currently received field. Since the Tanaka system only uses low frequency components from the previous field, the field memory may be of relatively small storage capacity.

A further example of a progressive scan system is described by Murata et al. in their article "A Consumer Use Flicker Free Color Monitor Using Digital Signal Processing"published in the IEEE Transactions on Consumer Electronics, Vol. CE-32, No. 3, Aug. 1986, pp. 215–227. Advantageously their system does not require the use of a motion detector and so avoids the possibility of motion detection errors producing visible artifacts. The system employs a field memory but is not, in fact, a hybrid system in that all extra lines for the progressive display are obtained on an intra-field basis by "adaptive" interpolation between adjacent lines of a currently received field. Specifically, a field memory is used to store a previously received line which is compared with lines of the currently received field to generate interpolation coefficients. The coefficients are varied depending on the amplitude of the signals from the previous and currently received lines. The field memory thus functions as a controller of the intra-field interpolation and not as a data store for displayed lines. Advantageously, this allows the field data to be stored in a memory of relatively small capacity but the variable intra-field interpolation requires relatively complex arithmetic processing to obtain the desired variable coefficients.

SUMMARY OF THE INVENTION

A need exists for a progressive scan display system having the high vertical resolution characteristic of inter-field processing, having the motion artifact immunity characteristic of inter-field processing, which avoids the problems characteristic of motion detector switching errors, and which does not require the use of variable interpolation coefficients or splitting the spectrum of processed lines into separate bands. The present invention is directed to meeting those needs.

The principles of the present invention may be applied to progressive scan display systems of the type which includes a processor means for deriving a processed video signal for display from an interlaced video input signal, speed-up means for time compressing and interleaving lines of the processed and input signals and display means for displaying the time compressed and interleaved lines in progressive scan fashion.

In accordance with a first aspect of the invention, the processor means comprises a first means for deriving a line-delayed video signal, a field-delayed video signal, a line-interpolated video signal and a vertical detail indicator signal from the video input signal. A second means selects the field-delayed video signal for application to the speed-up means as the processed signal when the detail signal is greater than a threshold value and the field-delayed signal is concurrently within a range of values bounded by the input and line-delayed signals and selects the line-interpolated signal otherwise.

In accordance with a further aspect of the invention, the second means includes range extension mans for extending the range of values to a range greater than the values bounded by the input and line-delayed signals.

BRIEF DESCRIPTION OF THE INVENTION

The foregoing and further features of the invention are illustrated in the accompanying drawing wherein like elements are denoted by like reference designators and in which.

DETAILED DESCRIPTION

Figure 1:
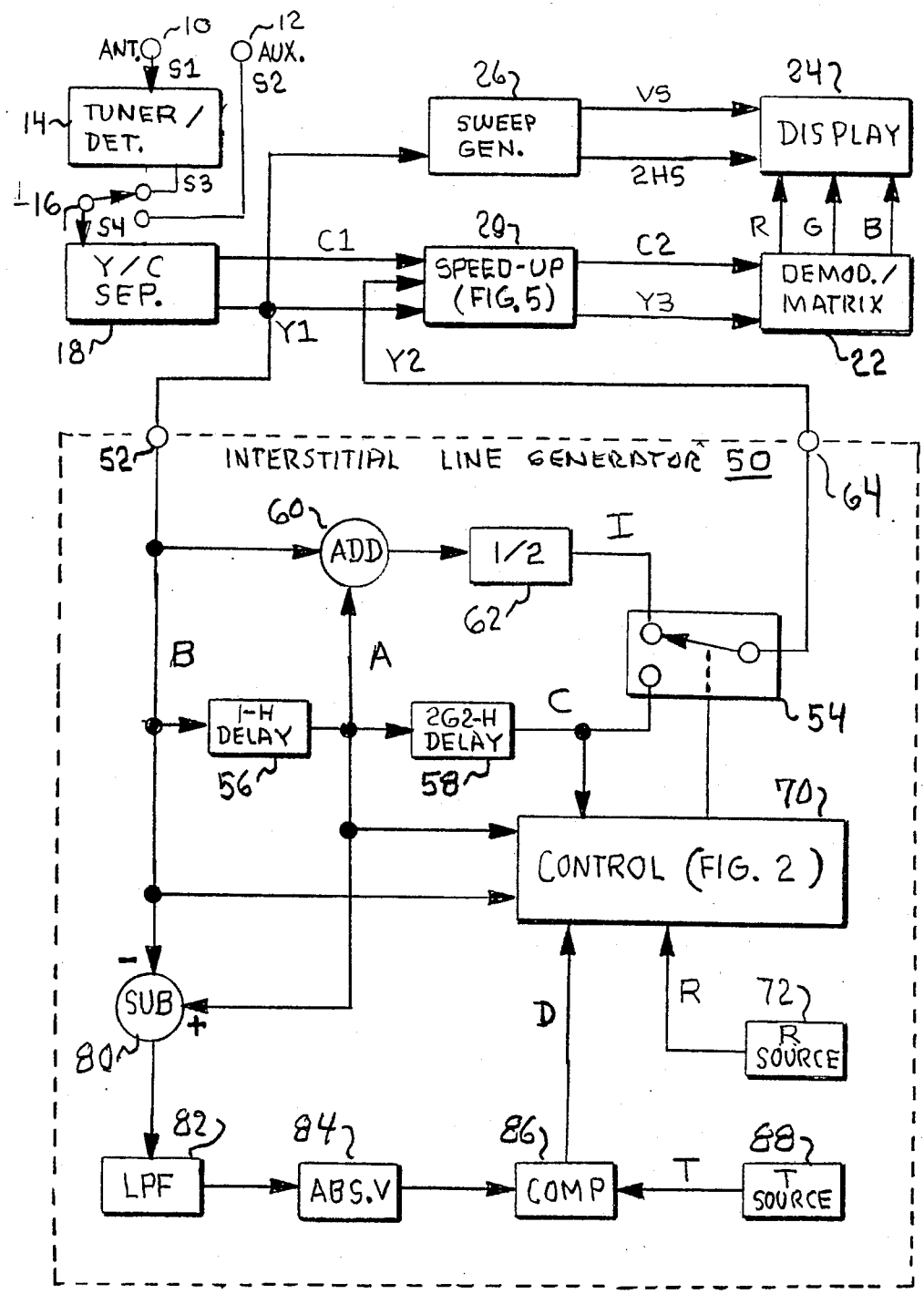
FIG. 1 is a block diagram of a progressive scan television receiver embodying the invention.

The receiver of FIG. 1 includes antenna and auxiliary inputs (10,12) for receiving RF modulated and baseband video input signals S1 and S2, respectively. A conventional tuner/detector unit 14 receives and demodulates the RF signal S1 to baseband form (signal S3) and an input selector switch 16 selectively couples the baseband signals S2 and S3 to the input of a luminance-chrominance signal separator 18. Switch 16 is placed in the position shown for receiving broadcast television signals and is changed over to the auxiliary input for use in monitor applications not requiring a tuner. The video input signal S4 selected by switch 16 is of interlaced form as used, for example, in the NTSC, PAL and SECAM television standards. For purposes of illustration the selected video input signal S4 will be assumed to be a composite color NTSC signal having a line rate of about 15.734 KHz and a field rate of about 59.94 Hz. For monochrome the rates would be 15750 Hz and 60 Hz, respectively.

Figure 5:
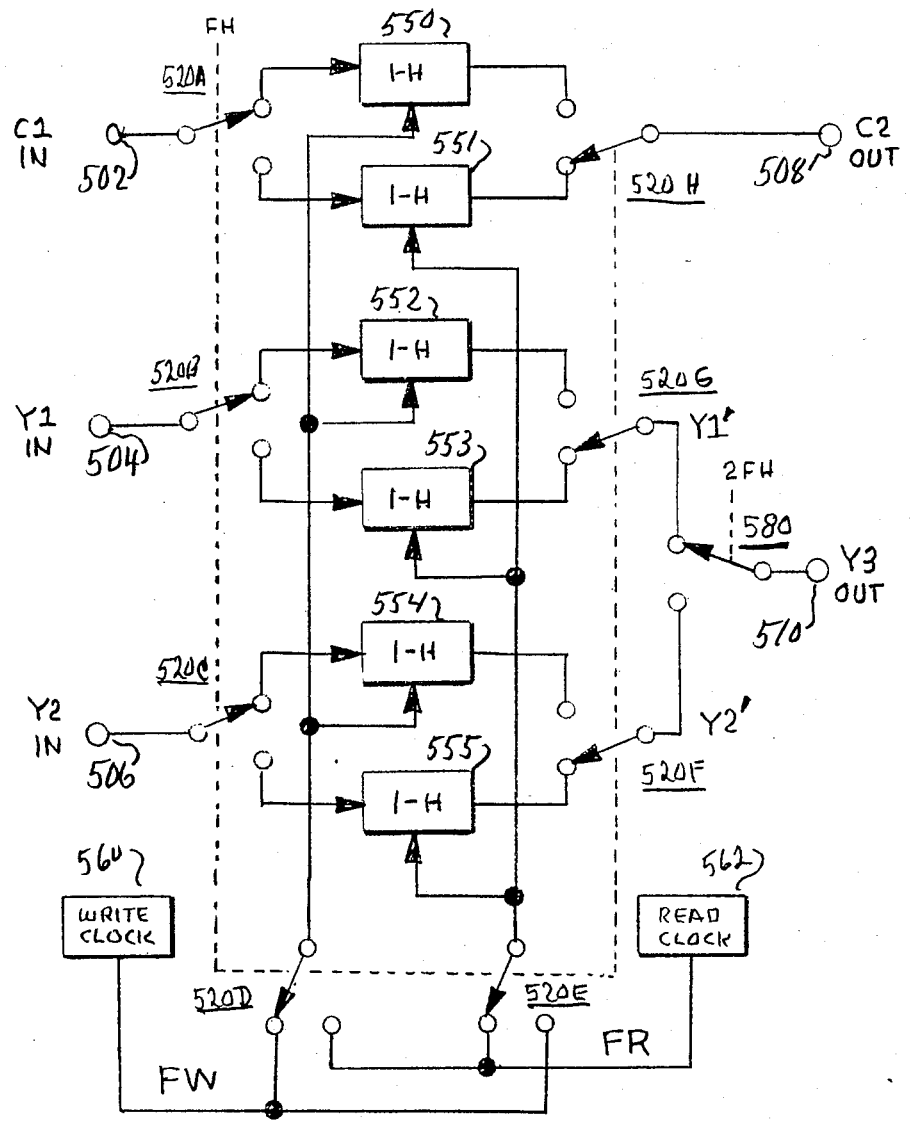
FIG. 5 is a detailed block diagram of a speed-up unit suitable for use in the receiver of FIG. 1.

After separation by unit 18 the chrominance and luminance components (C,Y1) of video signal S4 are applied to a speed-up unit 20 along with a further luminance signal Y2 derived from signal Y1 by an interstitial line generator 50 (outlined in phantom). The function of speed-up unit 20 is to double the line rate of chrominance signal C1 by time compressing and repeating chrominance signal lines and to double the line rate of the luminance signal by time compressing and interleaving lines of the incoming and derived lines Y1 and Y2. FIG. 5, discussed subsequently, provides details of a suitable implementation of unit 20. The double line-rate signals (C2 and Y3) so produced are applied to a chrominance signal demodulator and matrix unit 22 which includes conventional color demodulator circuits for converting chrominance signal C2 to R-Y B-Y form. Unit 22 also includes a matrix for combining the demodulated R-Y B-Y components with luminance signal Y3 to generate double line-rate RGB video output signals for display in progressive scan fashion on a display unit 24 (e.g., a kinescope). Display 24 receives a normal field-rate vertical sweep signal (e.g., about 60 Hz) and a double line rate horizontal sweep signal 2HS (e.g., about 31.5 KHz) provided by a sweep generator 26 synchronized by video signal Y1. Since the display line-rate has been doubled without changing the field rate, each video field of display 24 comprises 525 non-interlaced raster lines of which 42 are blanked during the vertical blanking interval leaving the remainder for display of the active video portion of the field interval. Such a display format has reduced visibility of line structure and lower interline flicker as compared with interlaced displays.

As an overview of the functions provided by interstitial line generator 50, the extra lines for display on unit 24 are derived from the luminance input signal Y1 in generator 50 by interpolation (averaging) of two vertically adjacent lines of signal Y1, field delaying signal Y1 and selecting the interpolated or field-delayed lines for use as signal Y2 as a function of two tests. One test involves a measurement of the vertical detail content of signal Y1. The other test involves a measurement of the amplitude of the field-delayed line relative to a range of values bounded by the current and previously received lines of signal Y1 (i.e., lines B and A, respectively). In the preferred embodiment of the invention shown, the range is extended by a reference value R to minimize visible artifacts which may be caused by quantizing noise or noise accompanying the input signal as will be explained. The selection process, very briefly stated, in that the field-delayed signal is selected for Y2 if the vertical detail of signal Y1 is greater than a threshold value and the field-delayed signal is concurrently within the range defined by signal Y1, signal Y1 delayed by one line (1−H) and a range control reference signal, R. The interpolated signal is selected if either or both tests are not satisfied as will be explained.

Considering now the details of generator 50, signal Y1 is applied to an input terminal 52 which is coupled to one input of a switch 54 via a cascade connection of a 1−H (one line) delay unit 56 and a 262−H delay unit 58. The input and output signals (B and A) of delay unit 56 are added in an adder 60 having an output coupled via an attenuator 62 (6 dB or 0.5 attenuation) to supply an averaged or interpolated signal (I) to a second input of switch 54. The non-delayed, line-delayed, field-delayed and interpolated signals are designated as B, A, C and I, respectively. Switch 54 selectively couples the interpolated signal I and the field-delayed signal C to output terminal 64 as signal Y2 under control of a control unit 70 coupled to receive signals A, B and C, a reference signal R provided by a reference signal source 72 and a vertical detail indicator signal D.

The vertical detail indicator signal D is produced by the combination of a subtractor 80 which subtracts signal B from signal A thus forming a one-line comb filter with delay unit 56, a low pass filter (e.g., 1-MHz) which removes residual chroma components (if any) from the combed signal, an absolute value circuit 84 which "rectifies" or passes the absolute value of the low-passed signal and a comparator 86 which compares the absolute value of the low pass filtered combed signal with a threshold level T provided by a threshold signal source 88. Illustratively, a suitable threshold setting for source T is on the order of 5-15 IRE units or so. In operation, the vertical detail signal will be HIGH (logic 1) if the difference between the currently received line B and the previous line A equals or exceeds signal T and will be LOW (logic zero) otherwise. It will be noted that for purposes of the vertical detail test it does not matter if signal A is greater (whiter) than signal B or vice versa because of the presence of the absolute value circuit 84. Thus the inputs to subtractor 80 may be reversed without affecting the vertical detail threshold test. If an absolute value circuit is not used, then separate positive and negative comparisons could be made to the low-pass filtered detail signal to determine if the detail meets the minimum threshold requirements. Use of the absolute value circuit eliminates the need for such separate threshold comparisons and combining logic (e.g., an OR gate).

Figure 2:
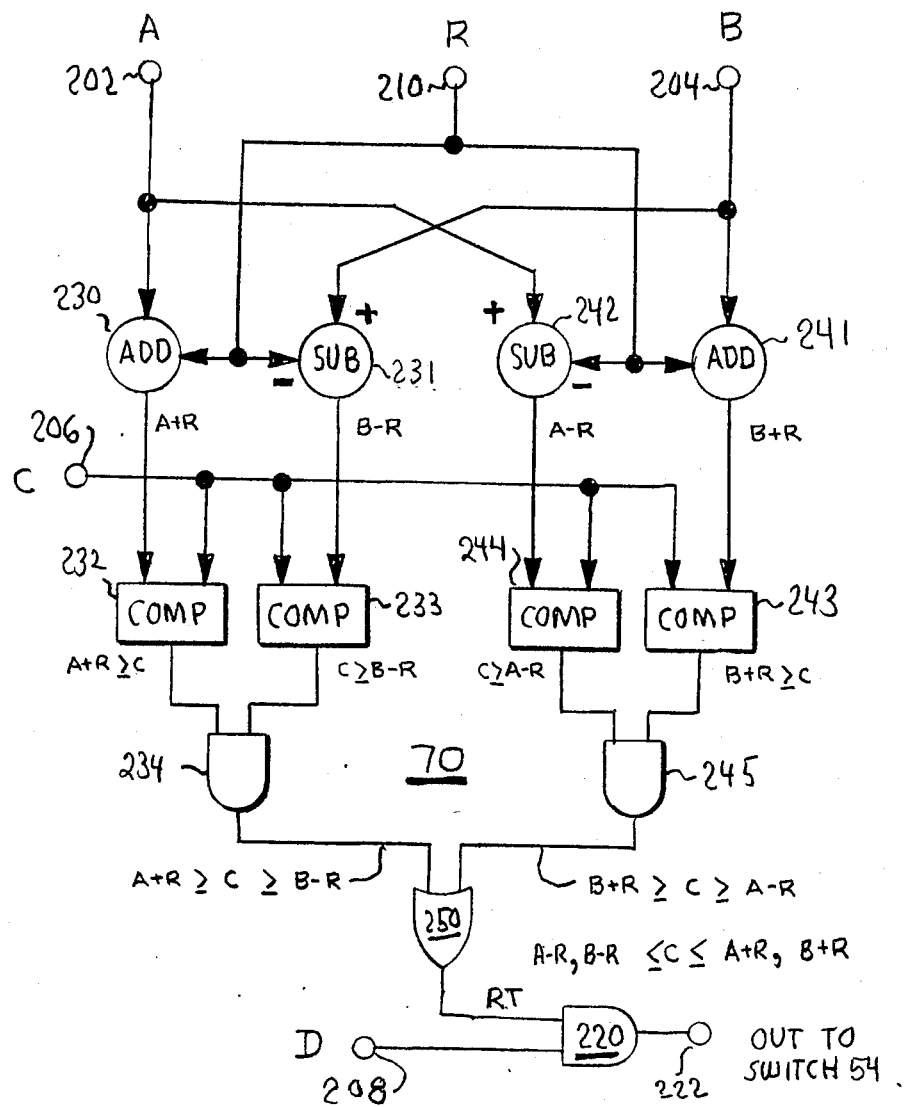
FIG. 2 is detailed block diagram of a control unit used in the receiver of FIG. 1 and embodying aspects of the invention.

Control unit 70 includes the line selection logic for generator 50 and is shown in detail in FIG. 2. Signals A, B, C, D and R are applied to inputs 202-210, respectively. The vertical detail indicator signal D is applied to one input of an AND gate 220 having a second input coupled to receive a range test signal RT and an output 222 coupled to switch 54. Gate 220 is enabled (output 222 HIGH) when RT and D are both concurrently HIGH and in this condition causes switch 54 to select the field-delayed signal C as signal Y2 for display on display 24 (interleaved with lines of signal Y1 by speed-up unit 20). Otherwise, the line interpolated signal I is selected and interleaved with Y1 for display on unit 24. Signal D is HIGH, as previously explained, only if there is significant vertical detail above threshold T in the incoming video signal Y1. The range test signal RT is HIGH only if the magnitude of the video signal C is within a range bounded by A and B. In the preferred embodiment of the invention shown, the range additionally includes the range extension variable R and the range test signal RT is HIGH if C is greater than or equal to the smaller of A−R and B−R and is less than or equal to the greater of A+R and B+R. The specific elements for generating the range test signal RT will be discussed subsequently.

Figure 3A:
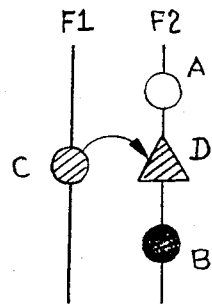
FIGS. 3A–3F and 4A–4F are spatio-temporal diagrams illustrating operation of the receiver of FIG. 1.
Figure 3B:
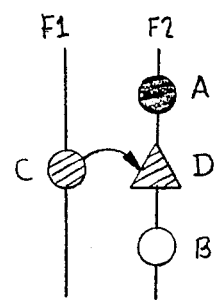

FIGS. 3A-3F are spatial-temporal diagrams illustrating cases where the vertical detail and range test conditions are satisfied and the signal C of the previous field is selected as the interstitial line (D) for display on display 24. Signal amplitudes are indicated by shading. FIG. 3A shows a case where there is a WHITE to BLACK transition between lines A and B of field 2 with line C being at a GRAY level during the previous field. In FIG. 3B the transition is from BLACK to WHITE. Since the transition in both cases (100 IRE units) is greater than the threshold value (e.g., 5-15 units) and C is within the range 0-100 defined by A and B, the signal of line C is selected as the interstitial line D as indicated by the arrow.

Figure 3C:
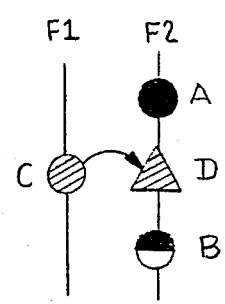
Figure 3D:
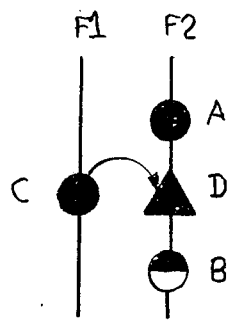

FIG. 3C illustrates a 50 IRE unit Black-to-gray transition in the current field with line C of the previous field being within the 0-50 IRE range. Line C is thus selected as the interstitial line D for display since the range and threshold tests are both met. FIG. 3D is an example where signal C of the previous field is equal to A of the current field and there is a 50 IRE transition between lines A and B. Here C=A and the vertical detail test is met so C is selected for interstitial line D for display between A and B.

Figure 3E:
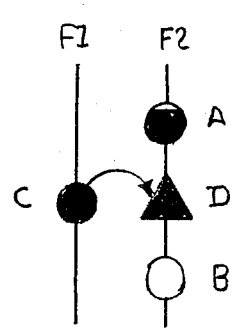
Figure 3F:
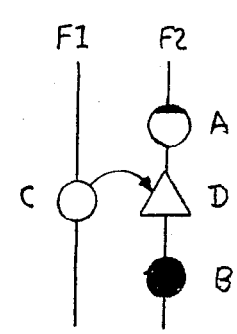

FIGS. 3E and 3F illustrate cases where C is not within the range defined by A and B but is within R of the AB range. In FIG. 3E the signal of line C is shown as zero IRE units and there is a transition from almost black (e.g., 2 IRE units) to white (100 IRE units) in the current field (F2). The range extension variable R is assumed to be 2 IRE units or greater. Thus C is within the required range which, for this case, extends from a minimum value of A−R to a maximum value of B+R. FIG. 3F is similar but the transition is of the opposite sense (i.e, almost white to black). Here C is whiter than A but within the range from B−R to A+R and so C is selected for D in field F2.

Figure 6:
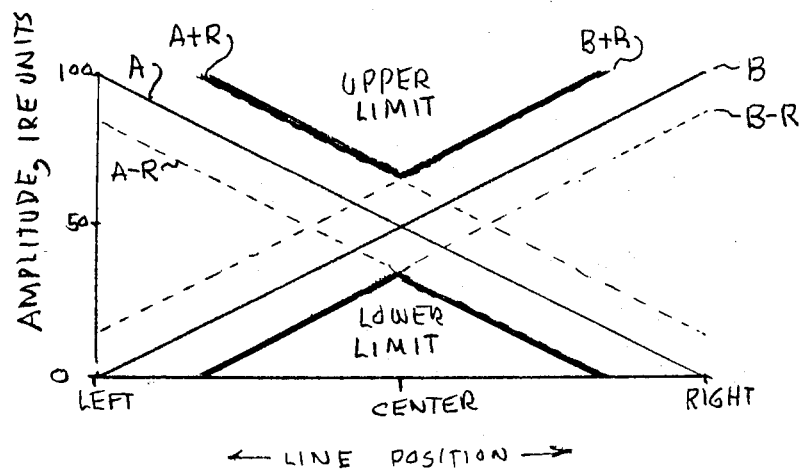
FIG. 6 is a diagram further illustrating operation of a control unit of the receiver of FIG. 1.

Summarizing the foregoing, the signal of the previous field (line C) is used as the interstitial line (D) in accordance with the invention for all cases where the vertical detail of the currently received video signal Y1 is greater than the threshold value T and concurrently the magnitude of the signal of the line C of the previous field (F1) is greater than or equal to A−R or B−R (whichever is smaller) and less than or equal to A+R or B+R (whichever is larger). This range selection function of upper and lower limits is illustrated in FIG. 6 in which the signal of the currently received line (B) is seen to be ramping from black (0 IRE units) to white (100 IRE units) and the signal of the previous line (A) is shown to have changed from white (100 IRE units) to black (zero IRE units). The upper limit of the range is signified by the solid line bounded by the greater of A+R and B+R and the lower limit is signified by the solid line bounded by the lesser of B−R and A−R. IF the magnitude of any portion of line C of the previous field is within this range (or equal to the range limiting values) and the vertical detail of the signal Y1 equals or exceeds the threshold then that portion of the signal of line C of the previous field will be selected for the interstitial line D of the currently displayed field.

Figure 4A:
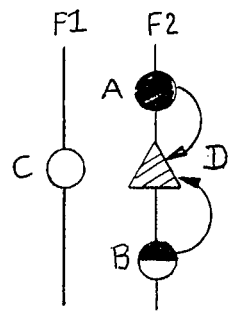
Figure 4B:
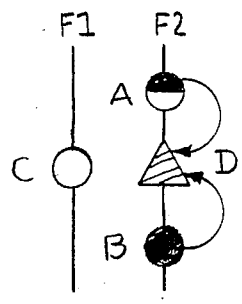
Figure 4C:
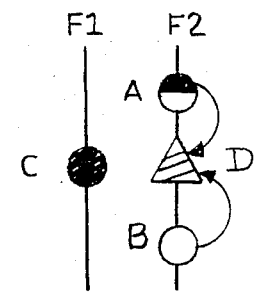
Figure 4D:
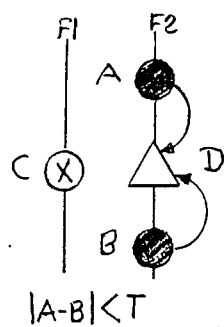
Figure 4E:
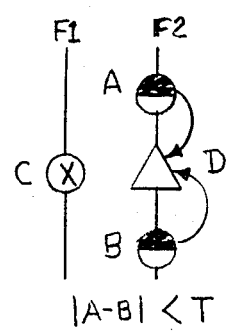
Figure 4F:
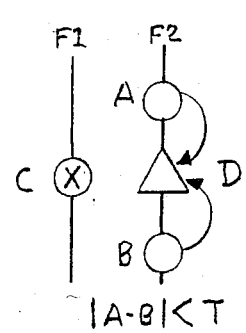

FIGS. 4A-4F provide six examples of signal conditions in which the foregoing range and vertical detail tests are not satisfied and the interstitial line is produced by averaging lines A and B. In FIGS. 4A-4C there are 50 IRE transitions in lines A and B of the current field (F2) thus satisfying the vertical detail test but line C of the previous field is not within the range defined by lines A and B. In FIGS. 4A and 4B, line C is at white level (100 IRE) and the transitions are from black to gray and vice versa. In FIG. 4C line C is at black level (zero IRE) and the transition is from grey to white (50 to 100 IRE). In FIGS. 4D, 4E and 4F the vertical detail test is not satisfied, that is, the difference in magnitudes of lines A and B are less than the threshold T. Thus, regardless of the value of line C (indicated by letter "X"), lines A and B are averaged to produce the interstitial line D.

Returning to FIG. 2, the range test to determine if the value of signal C of the previous field is within the range determined by A, B and R (as shown in FIG. 6) is provided in this example of the invention by performing two separate tests and combining the results. Specifically, for one test elements 231-234 process signal A, B, C and R to provide an output at AND gate 234 which is HIGH if A+R is greater than C and C is greater than B−R. This is implemented by adder 230 which adds A+R, subtractor 231 which subtracts R from B, comparators 232 and 233 which compare C with the outputs of adder 230 and subtrator 231 and AND gate 234 which combines the comparator output signals. The second test is provided by elements 241-245 and determines if C is greater than or equal to A−R and less than or equal to B+R. This is provided by adder 241 which adds B and R, subtractor 242 which subtracts R from A, comparators 243 and 244 which compare C with the outputs of adder 241 and subtractor 242 and AND gate 245 which produces a HIGH output signal if comparators 243 and 244 are enabled. The two range tests are combined in OR gate 250 which produces a HIGH output if either test is satisfied. Thus gate 220 is enabled whenever the vertical detail signal D is above the threshold level T and C is within the range having a minimum value equal to the smaller of A−R and B−R and a maximum value equal to the larger of A+R and B+R as shown by the solid upper limit and lower limit lines in FIG. 6.

FIG. 5, as previously mentioned, illustrates a suitable implementation of speed-up unit 20, and includes inputs 502-206 for receiving chrominance signal C1 and luminance signals Y1 and Y2 and outputs 508 and 510 for providing the double line-rate chrominance and luminance signals C2 and Y3 to display 24. A line-rate (60 Hz) operated switch having six sections (520A-520H) is arranged to write one line of signal C1, Y1 and Y2 into one-line (1-H) memories 550, 552 and 554 at a write clock rate FW selected by section 520D from a write clock 560. Concurrently one-line memories 551, 553 and 555 containing previously stored lines C1', Y1', Y2' are read at a read clock rate FR equal to 2 FW selected by section 520E from a read clock 562. The position of switch sections 520 A-F is changed over during the next line interval with lines being stored in memories 551, 553 and 555 and recovered from memories 550, 552 and 554. Since the read clock frequency FR is twice the write clock frequency, the lines recovered from the memories are time compressed by a factor of two. Thus there are two lines of chrominance signal C2 produced for each line of C1. A switch 580 operated at double the line rate (2 FH) alternately couples the time compressed signals Y1' and Y2' to output 510 thereby interleaving them for display on display 24 along with the time compressed and repeated chrominance signals.

Various changes may be made to the example of the invention herein shown and described. For example the chrominance signal may be subject to the same form of processing as the luminance signal rather than being repeated to double the line rate as shown. Also the luminance processing shown and described may be applied to component signals such as R, G and B or Y, R-Y and B-Y. Also logic circuits providing the same equivalent range and detail tests for signal selection may be used in place of the specific circuit shown in FIG. 2. In certain applications the range control variable R may be selected to be zero thus simplifying the range test if the effects of quantizing noise or low signal-to-noise ratio input signals are tolerable without use of the range extension feature of the invention.

What is claimed is:

1. In a progressive scan display system of the type comprising processor means for deriving a processed video signal for display from a video input signal, speed-up means for time compressing and interleaving lines of said input and processed video signals and display means for displaying the interleaved lines in progressive scan fashion, the improvement characterized in that said processor means comprises:
   first means for deriving a line-delayed video signal, a field-delayed video signal, a line-interpolated video signal and a vertical detail signal from said video input signal; and
   second means for selecting said field-delayed video signal for application to said speed-up means as said processed video signal when said detail signal is greater than a threshold value and said field-delayed signal is concurrently within a range of values bounded by said input and line-delayed signals and for selecting said line interpolated video signal otherwise.

2. A progressive scan display system as recited in claim I wherein said range of values includes a first limiting value equal to a sum of a range control signal plus the greater of said input and line-delayed signals and includes a second limiting value equal to a difference of the lessor of said input and line-delayed signals minus said range control signal.

3. A progressive scan display system as recited in claim 1 wherein said second means comprises:
   comparison means for determining if said field delayed video signal is within a first range of values and a second range of values, each range having upper and lower bounds which vary as a function of said input and line-delayed signals; and
   logic means coupled to said comparision means for selecting said field-delayed video signal when said detail signal is greater than said threshold value and said field-delayed video signal is concurrently within one of said first and second ranges of values.

4. A progressive scan display system as recited in claim 1 wherein said first means includes means for subtractively combining said input and line-delayed video signals to provide a difference signal, means for forming an absolute value signal from said difference signal and wherein said second means includes comparing means for comparing said absolute value signal with a reference signal for generating a vertical detail responsive threshold control signal.

5. A progressive scan display system as recited in claim 1 wherein said range of values includes an upper limiting value equal to the greater in a first sense of said input and line-delayed video signals and includes a lower limiting value equal to the lesser in a second sense of said input and line-delayed video signals.

6. A progressive scan display system as recited in claim 5 wherein said second means includes range extension means for extending said range of values to a range greater than said values bounded by said input and line-delayed video signals.

7. A progressive scan display system, comprising:
   input means for receiving an interlaced video input signal and providing a line-delayed video output signal, a field-delayed video output signal, a line-interpolated video output signal and a vertical detail signal;
   selection means coupled to said input means for providing a selected video output signal corresponding to said field-delayed video output signal when said vertical detail signal is greater than a threshold value and said field-delayed video output signal is concurrently within a range of values having upper and lower bounds controlled as a function of said input and line-delayed video signals, said selected video output signal corresponding to said line-interpolated video output signal otherwise;
   display means; and
   speed-up means coupled to said input means and said selection means for time compressing and interleaving lines of said input and selected video signals and coupled to supply the time compressed interleaved lines to said display means for display in progressive scan fashion.

8. A progressive scan display system as recited in claim 7 wherein said selection means further comprises range extension means for extending said range of values to a range greater than said upper and lower bounds.

9. A progressive scan display system as recited in claim 7 wherein said upper bound is equal to the greater of said input and line-delayed video signals and wherein said lower bound is equal to the lesser of said input and line-delayed video signals.

10. A progressive scan display system as recited in claim 7 wherein said upper bound is equal to a sum of a range control signal plus the greater of said input and line-delayed signals and said lower bound is equal to a difference of the lessor of said input and line-delayed signals minus said range control signal.

11. A progressive scan display system as recited in claim 7 wherein said input means includes means for subtractively combining said input and line-delayed video signals to provide a difference signal, means for forming an absolute value signal from said difference signal and wherein said selection means includes comparing means for comparing said absolute value signal with a reference signal for generating a vertical detail responsive threshold control signal.

12. A progressive scan display system, comprising:
  circuit means having input means for receiving an interlaced video input signal having a given line rate and output means for providing an interpolated video output signal and a vertical detail signal, each derived from adjacent vertical lines of said input signal, and for providing a line-delayed output signal and a field-delayed output signal;
  display means;
  speed-up means coupled to said circuit means for time compressing and interleaving lines of said input signal and a further signal supplied thereto and coupled to said display means for displaying said time compressed and interleaved signals in progressive scan fashion; and
  selection means for applying said field-delayed signal to said speed-up means as said further signal when said detail signal is greater than a threshold level and said field-delayed signal is concurrently within a selected one of first and second ranges values bounded by said input and line-delayed signals and for applying said interpolated signal to said speed-up means as said further signal otherwise.

13. A progressive scan display system as recited in claim 12 wherein said selection means further includes range extension means for increasing each of said first and second ranges of values by a predetermined amount.

* * * * *